United States Patent
McGee et al.

(10) Patent No.: US 7,245,820 B2
(45) Date of Patent: Jul. 17, 2007

(54) METHOD AND SYSTEM FOR SELECTING CHAPTER BOUNDARIES FOR DIGITAL VIDEO RECORDINGS

(75) Inventors: Thomas McGee, Garrison, NY (US); Mauro Barbieri, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1125 days.

(21) Appl. No.: 10/287,509

(22) Filed: Nov. 4, 2002

(65) Prior Publication Data

US 2004/0086258 A1    May 6, 2004

(51) Int. Cl.
*H04N 5/93*   (2006.01)
*G11B 27/10*  (2006.01)
*G11B 27/026* (2006.01)

(52) U.S. Cl. ............ 386/52; 386/46; 386/124; 386/125; 369/275.2

(58) Field of Classification Search ............ 386/1, 386/45, 46, 52, 69, 95, 124–126; 369/275.1–275.5
See application file for complete search history.

(56) References Cited

U.S. PATENT DOCUMENTS 5,956,453 A * 9/1999 Yaegashi et al. ............ 386/52

FOREIGN PATENT DOCUMENTS

| WO | 9855943 A2 | 12/1998 |
|----|------------|---------|
| WO | 0133863 A1 | 5/2001  |

* cited by examiner

*Primary Examiner*—Jeffrey Stucker
*Assistant Examiner*—David N. Werner
(74) *Attorney, Agent, or Firm*—Yan Glickberg

(57) ABSTRACT

A method for selecting a chapter boundary for a digital video recording is provided that includes examining cut-rates for the recording. A determination is made regarding whether a default chapter length has passed. A determination is made regarding whether the cut-rate for the recording at the default chapter length is low. The chapter boundary is selected at the default chapter length when the cut-rate for the recording at the default chapter length is low.

20 Claims, 3 Drawing Sheets

METHOD AND SYSTEM FOR SELECTING CHAPTER BOUNDARIES FOR DIGITAL VIDEO RECORDINGS

TECHNICAL FIELD OF THE INVENTION

The present invention relates generally to digital video processing and, more particularly, to a method and system for selecting chapter boundaries for digital video recordings.

BACKGROUND OF THE INVENTION

Digital video recording technology, such as DVD+RW technology, is rapidly progressing and gaining a large portion of the market for video recordings due to its picture and audio quality and ease of use. One example of the ease of use associated with these video recordings involves navigation of the recordings. Current digital video recording technology divides the video recording into segments called chapters so that users may more easily navigate within the recording, such as by instantly jumping to a particular scene within the video recording.

Typical video recordings include chapters of a fixed length, such as five minutes. However, using fixed length chapters may result in chapter breaks, or boundaries, that occur at inappropriate moments within the video recording. For example, a movie with fixed length chapters may have a chapter boundary right in the middle of an important battle scene or dialogue.

In addition, each chapter generally has a corresponding keyframe in order to identify the chapter for the user. Thus, for example, a user may search through a series of still pictures that are obtained from within the chapters in order to identify the chapter that he or she wishes to view. Currently, these keyframes are selected either automatically or by hand.

However, the currently available methods for automatically selecting keyframes use techniques such as shot break detection. This can result in chapters being divided in the middle of a high cut-rate area, such as may occur in a high action sequence or during a dialogue, as described above. Using a method of selecting keyframes by hand, however, is a cumbersome, personnel intensive process.

SUMMARY OF THE INVENTION

In accordance with the present invention, a method and system for selecting chapter boundaries for digital video recordings are provided that substantially eliminate or reduce disadvantages and problems associated with conventional systems and methods. In particular, chapter boundaries are selected based on cut-rates within the video recording such that action or dialogue scenes within the video recording are not divided between two chapters.

According to one embodiment of the present invention, a method for selecting a chapter boundary for a digital video recording is provided. The method includes examining cut-rates for the recording. A determination is made regarding whether a default chapter length has passed. A determination is made regarding whether the cut-rate for the recording at the default chapter length is low. The chapter boundary is selected at the default chapter length when the cut-rate for the recording at the default chapter length is low.

According to another embodiment of the present invention, a boundary selector for selecting a chapter boundary for a digital video recording is provided that includes a cut-rate indicator and a chapter length monitor. The cut-rate indicator is operable to examine cut-rates for the recording. The chapter length monitor is operable to determine that a default chapter length has passed. The boundary selector is operable to determine whether the cut-rate for the recording at the default chapter length is low and to select the chapter boundary at the default chapter length when the cut-rate for the recording at the default chapter length is low.

Technical advantages of one or more embodiments of the present invention include providing an improved method for selecting chapter boundaries for digital video recordings. In a particular embodiment, the cut-rate for a video recording is monitored for changes. As a result, chapter boundaries may be selected to correspond to low cut-rates within the video recording. Accordingly, action and/or dialogue scenes within the video recording may be kept together within a single chapter instead of being divided between two chapters.

Other technical advantages will be readily apparent to one skilled in the art from the following figures, description, and claims.

Before undertaking the DETAILED DESCRIPTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. In particular, a controller may comprise one or more data processors, and associated input/output devices and memory, that execute one or more application programs and/or an operating system program. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, wherein like reference numerals represent like parts, in which.

DETAILED DESCRIPTION OF THE INVENTION

Figure 1:
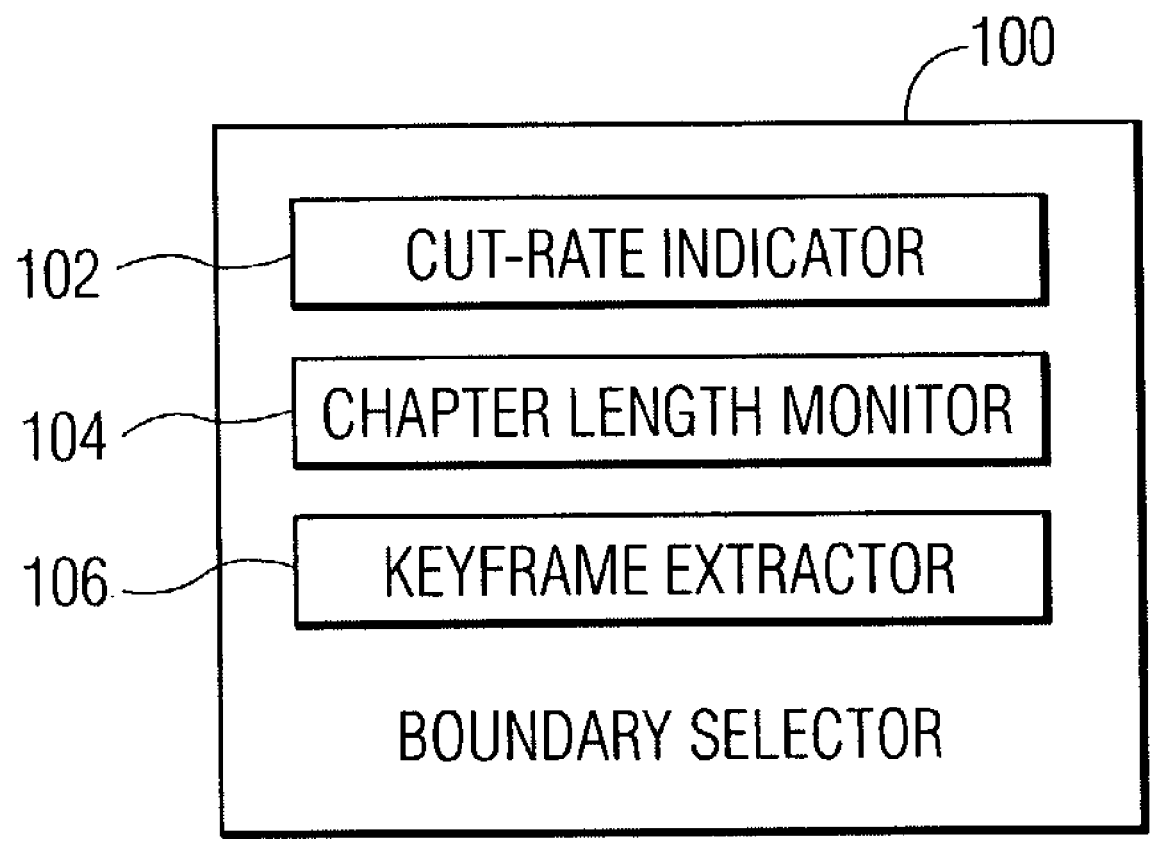
FIG. 1 is a block diagram illustrating a boundary selector that is operable to select chapter boundaries for digital video recordings in accordance with one embodiment of the present invention.
Figure 2:
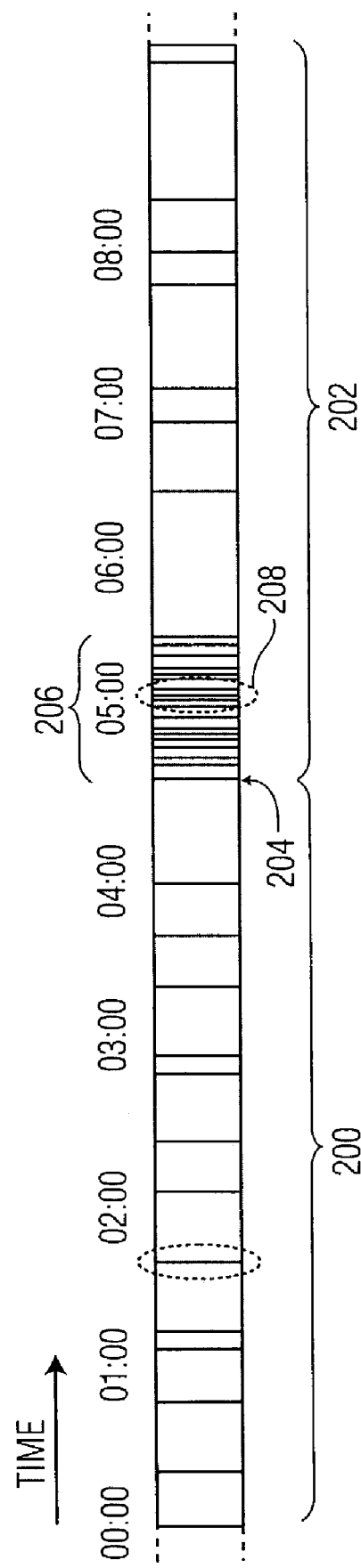
FIG. 2 is a block diagram illustrating an example of chapters that have a boundary that has been selected by the boundary selector of FIG. 1 in accordance with one embodiment of the present invention.
Figure 3:
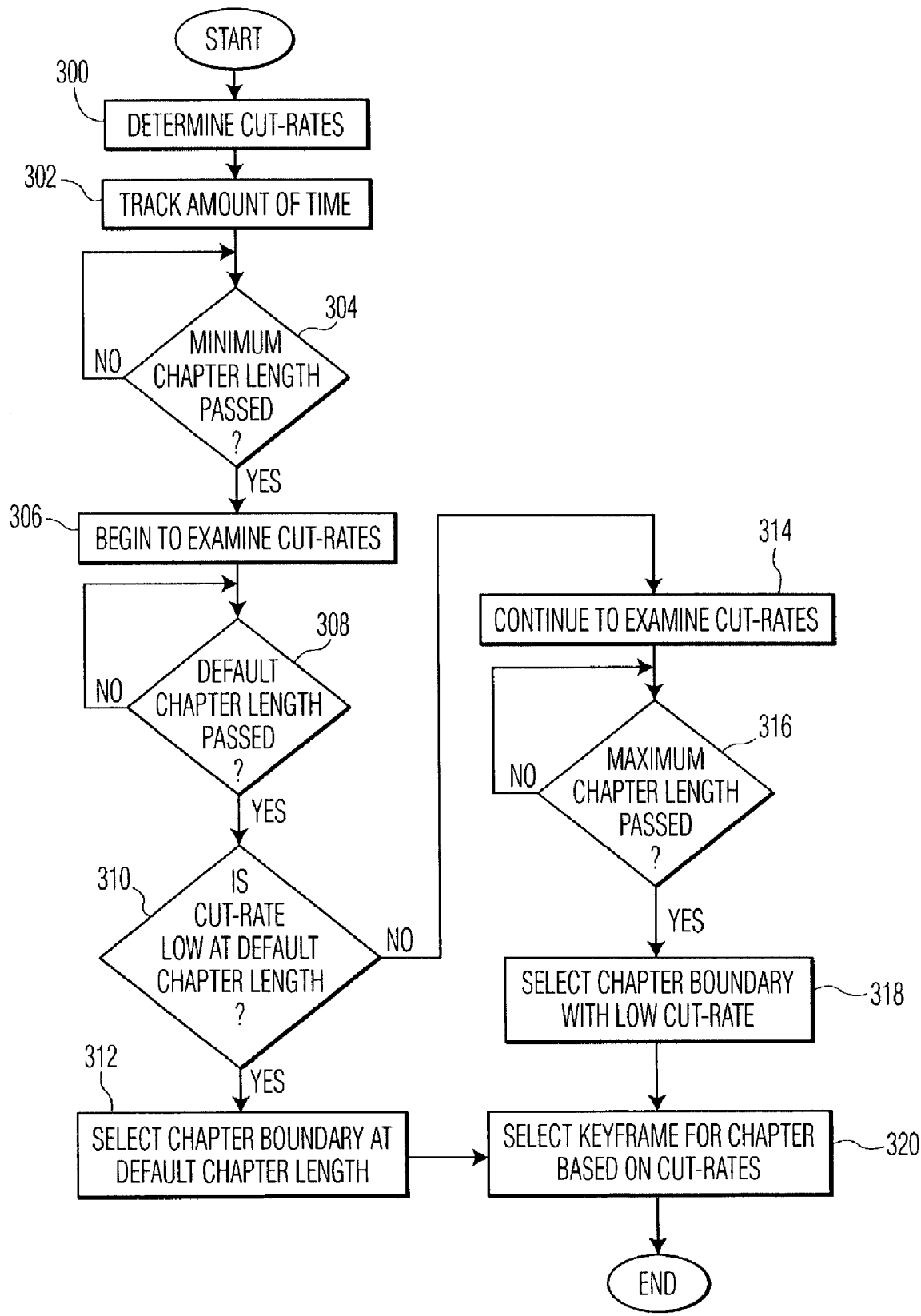
FIG. 3 is a flow diagram illustrating a method for selecting chapter boundaries for digital video recordings using the boundary selector of FIG. 1 in accordance with one embodiment of the present invention.

FIGS. 1 through 3, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged boundary selector.

FIG. 1 is a block diagram illustrating a boundary selector 100 that is operable to select chapter boundaries for digital video recordings in accordance with one embodiment of the present invention. The boundary selector 100 comprises a cut-rate indicator 102, a chapter length monitor 104, and a keyframe extractor 106. Although these components are illustrated and described individually, it will be understood that any two or all of the cut-rate indicator 102, the chapter length monitor 104, and the keyframe extractor 106 may be implemented together as a single entity without departing from the scope of the present invention.

The cut-rate indicator 102 is operable to analyze a digital video recording, such as a DVD+RW or other suitable recording, in order to determine cut-rates for the recording. The chapter length monitor 104 is operable to determine a chapter length for each chapter of the recording based on the amount of time that has passed in the video since the last chapter boundary. The keyframe extractor 106 is operable to select a keyframe for each chapter of the recording. As used herein, "each" means every one of at least a subset of the identified items.

Any or all of the cut-rate indicator 102, the chapter length monitor 104, and the keyframe extractor 106 may comprise logic encoded in media. The logic comprises functional instructions for carrying out program tasks. The media comprises computer disks or other computer-readable media, application-specific integrated circuits, field-programmable gate arrays, digital signal processors, other suitable specific or general purpose processors, transmission media or other suitable media in which logic may be encoded and utilized.

In order to select a boundary between two chapters, the cut-rate indicator 102 may determine cut-rates for a digital video recording. According to one embodiment, the cut-rate indicator 102 determines cut-rates by comparing pairs of frames to identify cuts and keeping track of the number of such identified cuts in relation to the amount of time passing in the video. Thus, the higher the number of cuts in a given time period, the higher the cut-rate.

As the cut-rate indicator 102 determines cut-rates, the chapter length monitor 104 may keep track of the amount of time that has passed in the video since the last chapter boundary. When the amount of time reaches a minimum chapter length, the cut-rates determined by the cut-rate indicator 102 are examined by the boundary selector 100 in order to identify an appropriate boundary for the chapters. The boundary selector 100 may continue to examine the cut-rates until the amount of time reaches a maximum chapter length.

According to one embodiment, the minimum and maximum chapter lengths may be approximately a same amount of time removed from a default chapter length such that the same amount of time exists between the minimum and default chapter lengths and between the maximum and default chapter lengths. However, it will be understood that the minimum and maximum chapter lengths may be otherwise defined without departing from the scope of the present invention. The amount of time between the minimum and maximum chapter lengths may comprise a boundary selection time frame such that the boundary selected by the boundary selector 100 may be anywhere within the boundary selection time frame.

For one example, the minimum chapter length may be four minutes, the default chapter length may be five minutes, and the maximum chapter length may be six minutes. For this example, the boundary selector 100 begins examining the cut-rates determined by the cut-rate indicator 102 after approximately four minutes have passed since the last chapter boundary, as determined by the chapter length monitor 104. The boundary selector 100 continues to examine the cut-rates until approximately five minutes have passed.

If the cut-rate is low at approximately five minutes, which in this example is the default chapter length, the boundary selector 100 selects the chapter boundary at approximately five minutes. However, if the cut-rate is high at approximately five minutes, the boundary selector 100 continues to examine the cut-rates until approximately six minutes have passed.

As used herein, "low" means that the cut-rate is less than a predetermined value and "high" means that the cut-rate is greater than or equal to the predetermined value. According to one embodiment, the predetermined value comprises approximately 0.25 cuts/second. However, it will be understood that the predetermined value may comprise any suitable number of cuts per second without departing from the scope of the present invention.

In the situation in which the cut-rate is high at approximately five minutes, the boundary selector 100 may select a chapter boundary at any point within the two-minute boundary selection time frame that has a low cut-rate. According to one embodiment, the boundary selector 100 selects the point nearest in time to the default chapter length at which the cut-rate is low. For this embodiment, if the cut-rate is low at times before and after the default chapter length that are the same amount of time from the default chapter length, the boundary selector 100 may be configured to select a particular one of the prior and subsequent times for the boundary.

According to one embodiment, once the boundary selector 100 selects the chapter boundary between the two chapters, the keyframe extractor 106 selects a keyframe for the chapter following the chapter boundary. However, it will be understood that the keyframe extractor 106 may select a keyframe for the chapter prior to the chapter boundary at this point.

According to one embodiment, when the chapter comprises a high cut-rate area, the keyframe extractor 106 selects a keyframe from within the high cut-rate area. However, it will be understood that the keyframe extractor 106 may select the keyframe for the chapter using any suitable method without departing from the scope of the present invention.

FIG. 2 is a block diagram illustrating an example of chapters 200, 202 that have a boundary 204 that has been selected by the boundary selector 100 in accordance with one embodiment of the present invention. For this example, a relatively high cut-rate area 206 exists just before and after a default chapter length of five minutes, in accordance with the example described above in connection with FIG. 1. This area 206 is high as compared to the cut-rates for the previous and subsequent areas of the recording.

Thus, the boundary 204 is selected to be prior to the default chapter length of five minutes such that the high cut-rate area 206 falls within a single chapter 202. Thus, the high cut-rate area 206 is not divided by a boundary 204. In addition, a keyframe 208 for the second chapter 202 is selected by the keyframe extractor 106 from within the high cut-rate area 206 at the beginning of that chapter 202.

FIG. 3 is a flow diagram illustrating a method for selecting chapter boundaries for digital video recordings using the boundary selector 100 in accordance with one embodiment of the present invention. The method begins at step 300 where the cut-rate indicator 102 determines cut-rates for a digital video recording. At step 302, the chapter length monitor 104 keeps track of the amount of time that has passed in the video since the last chapter boundary.

At decisional step 304, a determination is made regarding whether or not the minimum chapter length has passed. If the minimum chapter length has passed, the method follows the Yes branch from decisional step 304 to step 306. At step 306, the boundary selector 100 begins to examine the cut-rates determined by the cut-rate indicator 102.

At decisional step 308, a determination is made regarding whether or not the default chapter length has passed. If the default chapter length has passed, the method follows the Yes branch from decisional step 308 to decisional step 310.

At decisional step 310, a determination is made regarding whether or not the cut-rate is low at the point corresponding to the default chapter length. If the cut-rate is low, the method follows the Yes branch from decisional step 310 to step 312. At step 312, the boundary selector 100 selects the chapter boundary at the point corresponding to the default chapter length.

Returning to decisional step 310, if the cut-rate is high at the point corresponding to the default chapter length, the method follows the No branch from decisional step 310 to step 314. At step 314, the boundary selector 100 continues to examine the cut-rates.

At decisional step 316, a determination is made regarding whether or not the maximum chapter length has passed. If the maximum chapter length has passed, the method follows the Yes branch from decisional step 316 to step 318. At step 318, the boundary selector 100 selects a chapter boundary at any point within the boundary selection time frame that has a low cut-rate. From steps 312 and 318, the method continues to step 320.

At step 320, the keyframe extractor 106 selects a keyframe for one of the chapters that is bounded by the selected chapter boundary based on the cut-rates, at which point the method comes to an end. Thus, the keyframe extractor 106 may select a keyframe for the chapter following the chapter boundary or for the chapter prior to the chapter boundary. As previously described, for one embodiment, the keyframe may be selected from a high cut-rate area within the chapter.

Returning to decisional step 304, if the minimum chapter length has not passed, the method follows the No branch and remains at decisional step 304 until the minimum chapter length has passed.

Returning to decisional step 308, if the default chapter length has not passed, the method follows the No branch and remains at decisional step 308 until the default chapter length has passed.

Returning to decisional step 316, if the maximum chapter length has not passed, the method follows the No branch and remains at decisional step 316 until the maximum chapter length has passed.

Although the present invention has been described with several embodiments, various changes and modifications may be suggested to one skilled in the art. It is intended that the present invention encompass such changes and modifications as fall within the scope of the appended claims.

What is claimed is:

1. A method for selecting a chapter boundary for a digital video recording, comprising:
    examining cut-rates for the recording;
    determining that a default chapter length has passed;
    determining whether the cut-rate for the recording at the default chapter length is low; and
    selecting the chapter boundary at the default chapter length when the cut-rate for the recording at the default chapter length is low.

2. The method of claim 1, further comprising:
    determining whether a minimum chapter length has passed; and
    examining cut-rates for the recording comprising beginning to examine cut-rates when the minimum chapter length has passed.

3. The method of claim 1, further comprising continuing to examine cut-rates for the recording when the cut-rate for the recording at the default chapter length is high.

4. The method of claim 3, further comprising
    determining whether a maximum chapter length has passed, the minimum and maximum chapter lengths defining a boundary selection time frame; and
    selecting the chapter boundary within the boundary selection time frame, the chapter boundary corresponding to a chapter length at which the cut-rate for the recording is low.

5. The method of claim 4, selecting the chapter boundary within the boundary selection time frame comprising selecting the chapter boundary corresponding to a chapter length nearest to the default chapter length.

6. The method of claim 1, further comprising selecting a keyframe for a chapter following the chapter boundary based on the cut-rates for the recording.

7. The method of claim 1, further comprising selecting a keyframe for a chapter prior to the chapter boundary based on the cut-rates for the recording.

8. A boundary selector for selecting a chapter boundary for a digital video recording, comprising:
    a cut-rate indicator operable to examine cut-rates for the recording;
    a chapter length monitor operable to determine that a default chapter length has passed; and
    the boundary selector operable to determine whether the cut-rate for the recording at the default chapter length is low and to select the chapter boundary at the default chapter length when the cut-rate for the recording at the default chapter length is low.

9. The boundary selector of claim 8, the chapter length monitor further operable to determine whether a minimum chapter length has passed and the cut-rate indicator operable to examine cut-rates for the recording by beginning to examine cut-rates when the minimum chapter length has passed.

10. The boundary selector of claim 8, the cut-rate indicator further operable to continue examining cut-rates for the recording when the cut-rate for the recording at the default chapter length is high.

11. The boundary selector of claim 10, the chapter length monitor further operable to determine whether a maximum chapter length has passed, the minimum and maximum chapter lengths defining a boundary selection time frame, and the boundary selector further operable to select the chapter boundary within the boundary selection time frame, the chapter boundary corresponding to a chapter length at which the cut-rate for the recording is low.

12. The boundary selector of claim 11, the boundary selector operable to select the chapter boundary within the boundary selection time frame by selecting the chapter boundary corresponding to a chapter length nearest to the default chapter length.

13. The boundary selector of claim 8, further comprising a keyframe extractor operable to select a keyframe for a chapter following the chapter boundary based on the cut-rates for the recording.

14. The boundary selector of claim 8, further comprising a keyframe extractor operable to select a keyframe for a chapter prior to the chapter boundary based on the cut-rates for the recording.

15. A system for selecting a chapter boundary for a digital video recording, comprising:
 a computer-processable medium; and
 logic stored on the computer-processable medium, the logic operable to examine cut-rates for the recording, to determine that a default chapter length has passed, to determine whether the cut-rate for the recording at the default chapter length is low, and to select the chapter boundary at the default chapter length when the cut-rate for the recording at the default chapter length is low.

16. The system of claim 15, the logic further operable to determine whether a minimum chapter length has passed and to examine cut-rates for the recording comprising beginning to examine cut-rates when the minimum chapter length has passed.

17. The system of claim 15, the logic further operable to continue examining cut-rates for the recording when the cut-rate for the recording at the default chapter length is high, to determine whether a maximum chapter length has passed, the minimum and maximum chapter lengths defining a boundary selection time frame, and to select the chapter boundary within the boundary selection time frame, the chapter boundary corresponding to a chapter length at which the cut-rate for the recording is low.

18. The system of claim 17, the logic further operable to select the chapter boundary within the boundary selection time frame by selecting the chapter boundary corresponding to a chapter length nearest to the default chapter length.

19. The system of claim 15, the logic further operable to select a keyframe for a chapter following the chapter boundary based on the cut-rates for the recording.

20. The system of claim 15, the logic further operable to select a keyframe for a chapter prior to the chapter boundary based on the cut-rates for the recording.

* * * * *